United States Patent [19]

Geiser

[11] Patent Number: 4,809,950
[45] Date of Patent: Mar. 7, 1989

[54] VALVE SLIDE WITH SLIDE HOUSING

[75] Inventor: Friedrich Geiser, Nüziders, Austria

[73] Assignee: Siegfried Schertler, Switzerland

[21] Appl. No.: 197,116

[22] Filed: May 20, 1988

[30] Foreign Application Priority Data

May 26, 1987 [DE] Fed. Rep. of Germany ....... 3717724

[51] Int. Cl.$^4$ .................................................. F16K 3/18
[52] U.S. Cl. ..................................... 251/328; 251/326
[58] Field of Search ................ 251/326, 328, 329, 333

[56] References Cited

U.S. PATENT DOCUMENTS 4,483,514 11/1984 Kennedy .......................... 251/326 X
4,531,539 7/1985 Jandrasi et al. .................. 251/326 X Primary Examiner—A. Michael Chambers
Assistant Examiner—John C. Fox
Attorney, Agent, or Firm—Toren, McGeady & Associates

[57] ABSTRACT

A valve slide has a housing with a sealing surface which has portions located one behind the other seen in direction of the axis of a slide passage opening. The portions located one behind the other are connected to outwardly extending plane sealing surface portions through continuously extending curved portions. The imaginary generatrices of the sealing surface portions forming a sealing surface extend parallel to the axis of the slide passage openings. The sealing surface is finished. The closing member has a contact surface corresponding to the shape of the sealing member. The slide can be used in vacuum systems. The closing member is formed of one piece and can be subjected to high accelerating forces, so that the slide can be used for quick-closing valves and emergency valves.

11 Claims, 4 Drawing Sheets

VALVE SLIDE WITH SLIDE HOUSING

BACKGROUND OF THE INVENTION

1. Field of the Invention

The present invention relates to a valve slide with a slide housing. The slide has a passage opening which can be closed by means of a closing member which is slidable in its plane. A sealing surface is provided in the region of the slide passage opening. In the closed position of the closing member, a circumferentially closed sealing member arranged on the closing member rests against the sealing surface. Each imaginary straight generatrix of the sealing surface extends parallel to the axis of the slide passage opening. The circumferentially closed sealing member which is formed of one piece has sections of different length and/or shapes which are located in different planes. Two principal sections of the sealing member are located in planes which extend perpendicularly to the axis of the slide passage opening. The two principal sections are spaced apart from each other and are connected by lateral sections. The closing member has a surface which carries the circumferentially closed sealing member and corresponds in its shape to the sealing surface of the housing.

2. Description of the Prior Art

A valve slide of the above-described type is known. The housing of this valve slide is made in one piece of gray cast iron and has rough sealing surfaces and is structurally very simple. The closing member, which may also be made in one piece, has a large volume and is made of a rubber-elastic material which, because of its large elastic volume, can compensate the above-described roughness of the unfinished sealing surface of the one-piece housing. Valve slides of this type are used in water supply mains. This type of valve slide is completely unsuitable in situations where high-quality seals are necessary and required as in, for example, vacuum and high-vacuum systems because the required degree of tightness cannot be achieved with valve slides of this type.

In a valve slide of a similar type disclosed in German Auslegeschrift No. 12 23 212, the sealing member is pressed with a U-shaped lower portion in the lower region of the slide plate against the inner side of the flow duct and with a stirrup-shaped upper portion in the upper region of the slide plate against the outer wall of the flow ducts. The sealing member is mounted in grooves in the housing. In addition, the sides of the U-shaped lower portion of the sealing member rest with the ends thereof against projections attached to the housing and, moreover, the U-shaped lower portion of the sealing member is reinforced by a resilient insert. The sealing member is made of one piece. The upper portion and the lower portion are connected through webs which extend parallel to the axis of the passage opening. When the valve slide is actuated, the slide plate slides transversely along these webs which rest against surfaces which are inclined obliquely relative to the direction of movement of the slide plate. Accordingly, there is the danger that the surfaces of the sealing member are damaged in the region of these webs, so that a valve slide of this specific construction is not suitable for vacuum systems and high-vacuum systems.

Slides for the use in vacuum and high-vacuum systems have been developed. The closing members of these slides for these systems requiring high-quality seals are always constructed in several parts. The closed members have a sealing plate with an annular seal which is arranged on the sealing plate and is located in a plane. A sealing surface on the housing receiving this plane annular seal extends perpendicularly to the axis of the slide passage opening. A spreading device is connected to the sealing plate which carries the sealing ring.

As disclosed in Swiss Pat. No. 659,512 and U.S. Pat. No. 4,560,141 tiltable block-type members have been developed for these spreading devices. The tilting motion of the block-type member effects the axial displacement of the structural components of the closing member, so that the sealing member is placed and pressed against the sealing surface. Rolling members have also been used in such spreading devices. The rolling members run onto inclined tracks so as to achieve the above-mentioned axial displacement of the structural components supporting and guiding the rolling bodies, as disclosed in German Pat. No. 32 09 217, German Offenlegungsschrift Nos. 24 04 944, 25 28 043, U.S. Pat. Nos. 3,185,435 and 4,291,861. The prior art also includes spreading devices with swingable lever systems which usually cooperate with springs, as described in German Auslegeschrift No. 25 23 152, U.S. Pat. Nos. 3,216,694, 2,850,260 and 3,262,672. Also, closing members have been proposed which are operationally connected to chambers to which a pressure can be admitted, so that the closing member moves into the slide passage opening or the sealing ring supported by the closing member and the sealing plate rest against the sealing surface of the housing.

It is apparent that the closing member constructions of the above-described valve slides used for high quality seals are extremely complicated and cumbersome. Also, it should be noted that these parts which form the entire closing member move relative to each other during operation and sometimes extremely high forces act on these parts. In addition, the parts which move relative to each other cannot and may not be lubricated because the vacuum would otherwise be impaired.

The above-described complicated constructions have the additional disadvantage that a closing member having many parts cannot be used in quick-closing valves and emergency valves because, under the influence of high accelerating forces as they are unavoidable in quick-closing valves and emergency valves, the spreading mechanism begins already to operate to inertness before the closing member has been moved into its closing position, so that the closing member is wedged into the housing portion in which it is received before it reaches the closing position.

It is, therefore, the primary object of the present invention to further develop a valve slide of the above-described type, so that it can be used in vacuum systems and high-vacuum systems in which high-quality seals are needed. In order to meet these requirements, the reproducible conditions in the various closing procedures must be provided for all portions of the circumferentially extending sealing member. In addition, during closing of the sealing member and when the closing pressure is applied, the load should be applied on the sealing member only essentially transversely of its longitudinal direction, so that transverse forces on the sealing member are avoided. Moreover, it must be possible to finish the sealing surfaces in order to meet the sealing requirements. Also, the closing member proper should have few parts which are movable relative to each other, so that the closing member can also be used in quick-closing and emergency valves where high accelerations occur.

SUMMARY OF THE INVENTION

In accordance with the present invention, the lateral sections of the circumferentially closed sealing member are U-shaped and the sides of these U-shaped lateral sections are located in a plane. The sealing surface has portions which are located one behind the other in axial direction of the slide passage opening. The sealing surface portions are contacted by the principal sections of the sealing member. The sealing surface portions have an area in which they have a common straight generatrix which extends parallel to the axis. In this area, laterally outwardly extending plane sealing surface portions are connected to the sealing surface portions which are located one behind the other. The plane sealing surface portions are located in planes which extend parallel to each other and parallel to the axis of the slide passage opening.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described preferred embodiments of the invention.

DETAILED DESCRIPTION OF THE INVENTION

Figure 1:
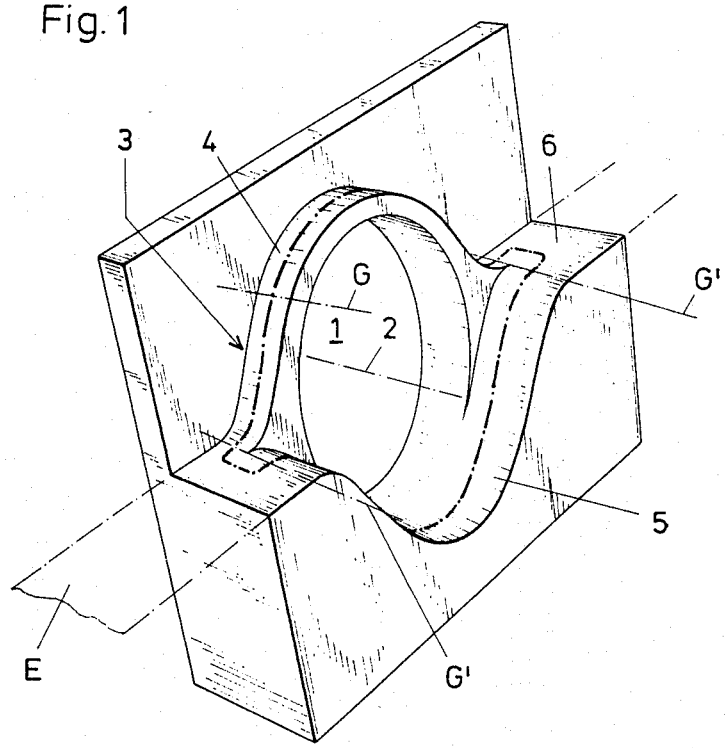
FIG. 1 is a schematic perspective view of a slide housing including sealing surface.

FIG. 1 of the drawing shows the portion of the slide housing or forms a part of the slide housing which participates in the sealing action, as shall be described hereinbelow. The slide housing has a slide passage opening 1 with an axis 2 illustrated in a dash-dot line. The opening 1 is surrounded by a sealing surface 3 which has different portions 4, 5 and 6 having different shapes. The portions 4 and 5 are formed by cylindrical surfaces, while the portions 6 are formed by plane surfaces. The cylindrically-shaped portions 4 and 5 and the plane portions 6 lead into each other through continuously extending curvatures. The two lateral, plane, outwardly extending portions 6 of sealing surface 3 are located in a common plane E which is indicated by a thin dash-dot line in FIG. 1. Independently of the different shapes of portions 4, 5 and 6 of the sealing surface 3, these portions have in common that the imaginary generatrix of each portion is straight and extend parallel to the axis 2 of the passage opening. Two such generatrices are illustrated in FIG. 1 at G and G'. Dash-dot line 7 which is indicated in FIG. 1 on sealing surface 3 is the line where the sealing member 8 rests against the sealing surface 3 when the closing member is moved in. As can also be seen in FIG. 1, portions 4 and 5 of sealing surface 3 are located one behind the other in the direction of the axis 2 of the slide passage opening 1.

Figure 2:
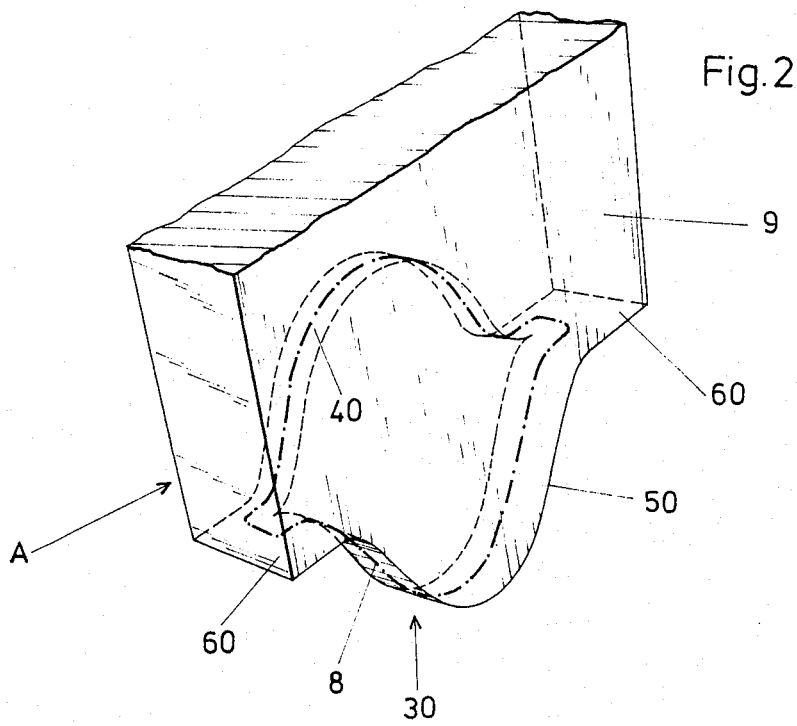
FIG. 2 is a schematic perspective view of the corresponding portion of a closing member.
Figure 3:
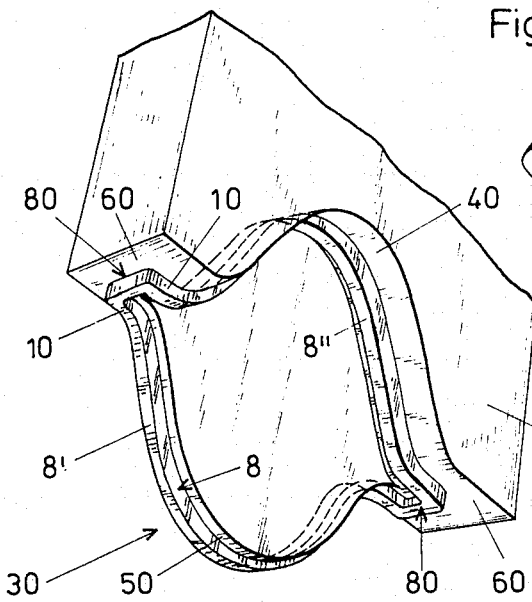
FIG. 3 is a perspective view of the sealing member of FIG. 2 seen in the direction of arrow A of FIG. 2.
Figure 4:
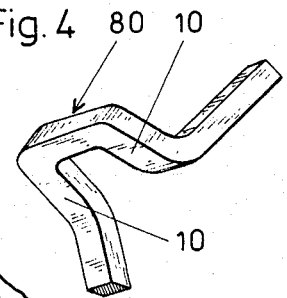
FIG. 4 is a perspective view, on a larger scale, of a portion of the circumferentially extending sealing member.

FIG. 2 of the drawing shows a closing member 9 which is illustrated in a position corresponding to that of the slide housing shown in FIG. 1. In FIG. 3, the closing member 9 is illustrated from the opposite side. In its area which participates in the sealing action, the closing member 9 has a surface 30 which is shaped to correspond to the sealing surface 3 in the valve slide housing. Surface 30 carries and supports the circumferentially closed sealing 8. For example, the sealing member 8 may be vulcanized onto surface 30. The portions 40, 50 and 60 of surface 30 which support sealing member 8 and the above-mentioned portions 4, 5 and 6 of the sealing surface 3, which are located immediately next to each other when the closing member 9 is moved in, have been provided with the same reference numerals with the exception of an 0 having been added to distinguish between the portions.

As can be seen from the above-discussed figures of the drawing, the circumferentially closed, single-piece sealing member 8 has sections of different shape which are located in different planes relative to the plane of the passage opening 1. Two principal sections 8', 8" of the circumferentially closed sealing member 8 are located in planes which extend perpendicularly relative to axis 2 of slide passage opening 1. In the direction of axis 2, the two principal sections 8', 8" are located offset relative to each other. The two principal sections 8' and 8" of sealing member 8 are connected to each other through lateral sections 80 which are U-shaped and whose sides 10 are located in planes 60.

Figure 5:
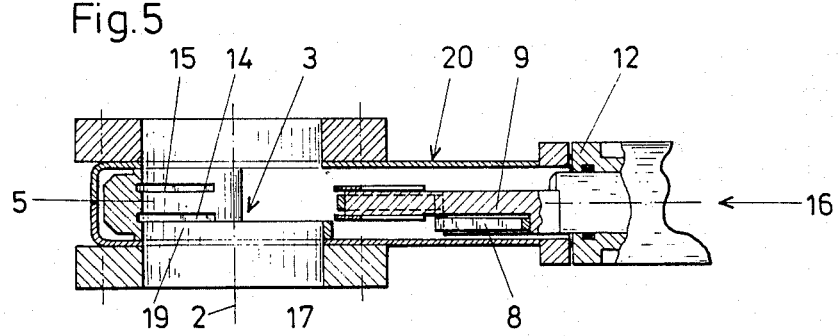
FIGS. 5 and 6 are a transverse and a longitudinal sectional view of a first embodiment of the valve slide according to the present invention.
Figure 6:
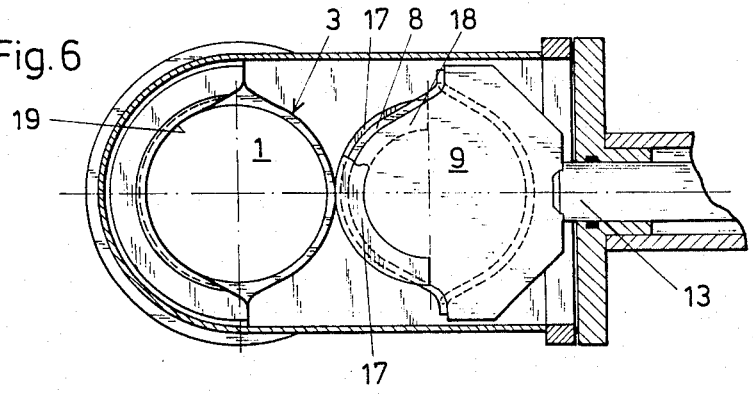

The portions 4 and 5 of the sealing surface 3 for contacting the principal portions 8' and 8" of sealing member 8 are located one behind the other seen in axial direction 2 of the slide passage opening 1. In the area in which the portions 4 and 5 have a common, straight and axially parallel generatrix D', the portions 4 and 5 lead into lateral, outwardly extending, plane portions 6 which, in turn, are arranged in a common plane E which extends parallel to axis 2 of slide passage opening 1. FIGS. 5 and 6 of the drawing are transverse and longitudinal sectional views of a valve slide according to the present invention for use in high-vacuum systems. The valve slide is a quick-closing slide. It is to be noted at this point that the slide housing 20 is constructed in two parts and that the part 19 with the sealing surfaces 3 is a structural component manufactured separately from housing 20. Part 19 is inserted into and tightly welded to the housing 20. Accordingly, part 19 can be manufactured and finished separately from the housing.

The illustrations of FIGS. 5 and 6 also show that the closing member 9 has a protective rim 17 each on either side of the sealing member 8 at the lower edge 18 relative to the slide housing 20. Each protective rim 17 is laterally spaced from the sealing member 8 seen in axial direction and protrudes relative to sealing member 8 in sliding direction of the closing member 9, as indicated by arrow 16.

Section 5 of sealing surface 3 has grooves 14 and 15 which receive the two protective rims 17 of the closing member 9 when the closing member 9 is moved in. Also, closing member 9 is directly connected to a piston rod 13 of a piston-cylinder unit 12. The closing member 9 may be guided laterally in side housing 20. Piston-cylinder unit 12 is a quick-acting unit, so that extremely high closing speeds are obtainable and the valve slide according to FIGS. 5 and 6 can be used as a quick-closing or emergency slide.

As is apparent from the foregoing, the closing member 9 is manufactured in a single piece. In other words, closing member 9 does not have parts which are movable relative to each other, as is the case in previously known slide constructions for vacuum systems and high-vacuum systems. Therefore, closing member 9 can be subjected to extremely high acceleration forces without there being the danger that the closing member is wedged within the housing before it reaches its closing and sealing position.

The protective rims 17 protect the sealing member 8 from the flow passing through the slide passage opening 1. Accordingly, the slide member 9 can be moved, for example, into an energy-rich electron beam without the sealing member 8 being hit by this energy-rich beam and being damaged or at least impaired in its service life.

Figure 7:
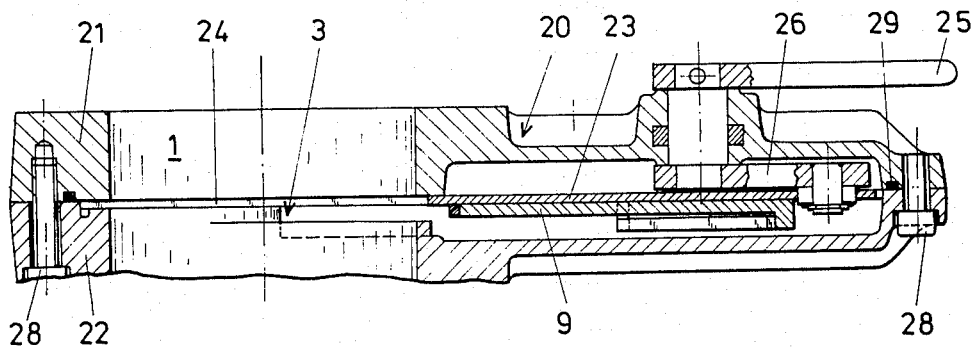
FIGS. 7 and 8 are a transverse and a longitudinal sectional view of a second embodiment of the valve slide according to the present invention.
Figure 8:
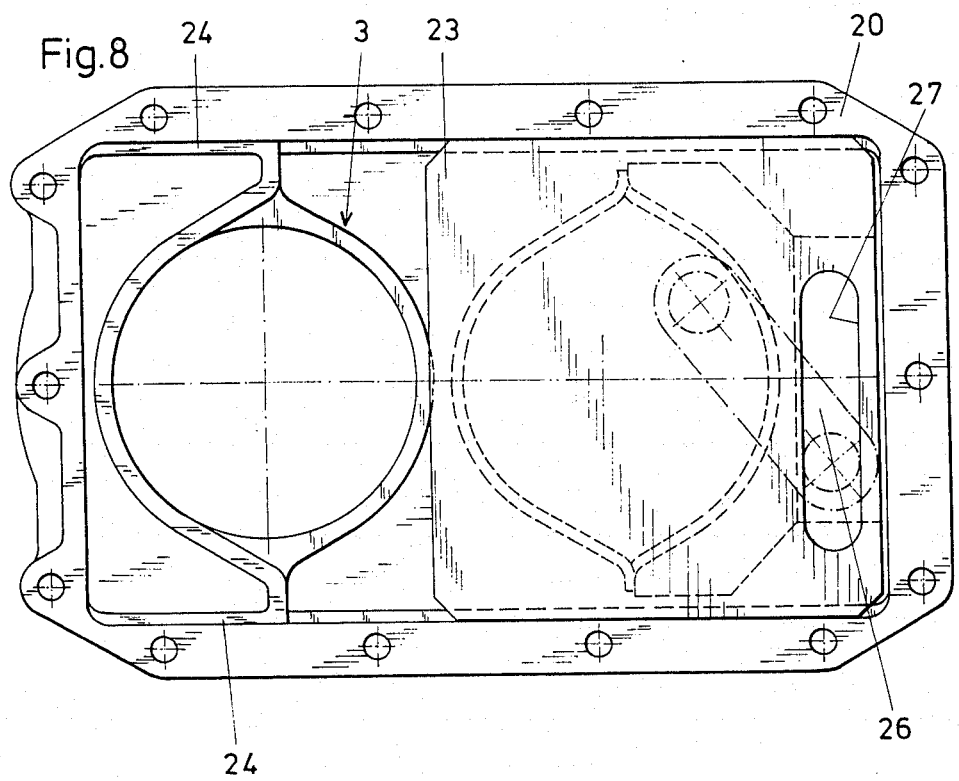

While the slide housing in the embodiment according to FIGS. 5 and 6 is a welded construction with an inserted part 19 for the sealing surface 3, FIGS. 7 and 8 show, in transverse and longitudinal sectional views, a valve slide having a cast housing 20. The two housing shells 21 and 22 forming the housing 20 are manufactured separately. The sealing surfaces 3 are provided on housing shell 22. After the housing shell 22 has been cast, the sealing surfaces 3 can be finished in the manner necessary for high sealing requirements.

In the embodiment of FIGS. 7 and 8, the closing member 9 is fastened on a support plate 23 and extends parallel to this support plate 23. Support plate 23, in turn, is guided with its edge in grooves 24 of housing 20. The closing member 9 or the support plate 23 is actuated through connecting links 25 and 26 and a guide opening 27. The closing pressure is also applied through this connecting link system. The two housing shells 21 and 22 are connected to each other by means of screws. A sealing member 29 may be arranged between the two housing shells. The actuating mechanism including the connecting links 25 and 26 and guide opening 27 is known in valve slides. However, in the past, the closing mechanisms were of substantially more complicated construction because the mechanisms not only had to move the closing member into the closing position, but they also had to press the closing member into the sealing position.

Figure 9:
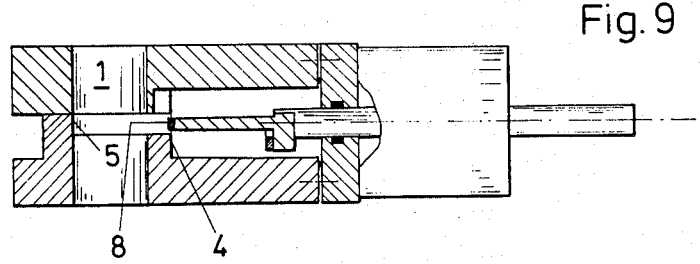
FIGS. 9 and 10 are a transverse and a longitudinal sectional view of a third embodiment of the valve slide according to the present invention.
Figure 10:
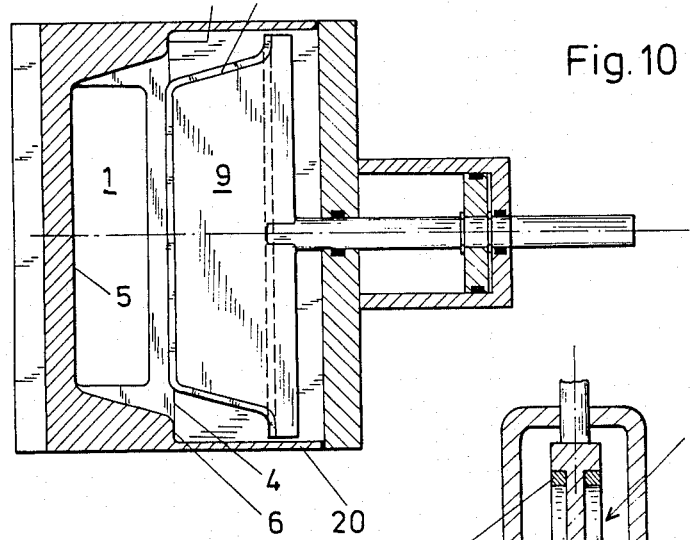

In the valve slides discussed above, the slide passage openings 1 have a circular shape. FIGS. 9 and 10, on the other hand, show a sluice-type slide in transverse and longitudinal sectional views with a passage opening 1 having a rectangular shape. The sections 4, 5 and 6 of the sealing surface in the slide housing 20 are identified accordingly in FIG. 10.

The valve housing 20 is again manufactured in two parts, so that the sealing surface 30 in housing 20 can be finished. As can also be seen in FIG. 10, the two principal sections 8' and 8" of the circumferentially closed sealing member have over the length thereof a different shape. Principal section 8' is straight while the other principal section 8" is curved.

Figure 11:
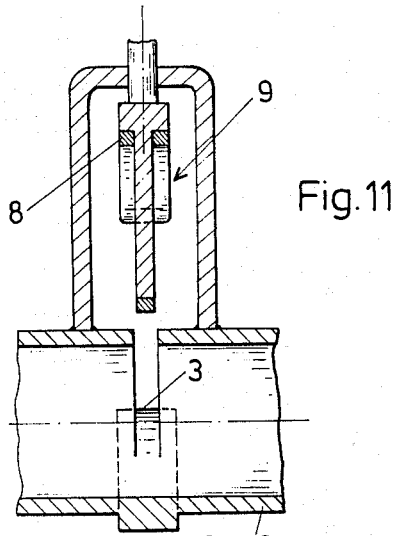
FIGS. 11 and 12 a schematic longitudinal section and a schematic horizontal transverse section of another embodiment of the valve slide according to the present invention.
Figure 12:
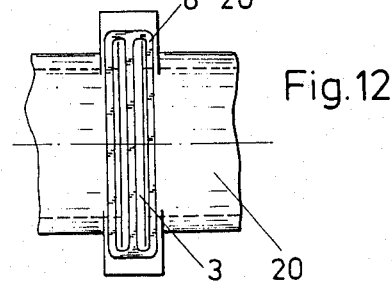

All above-discussed figures of the drawing show embodiments in which the sealing surface 3 in the housing and the sealing member 8 are constructed symmetrically relative to a plane which extends transversely of axis 2 and includes the passage opening 1 of the valve slide. It is within the scope of the present invention to construct the sealing member 8 and the surface 30 of the closing member 9 carrying the sealing member 8 as well as the sealing surface 3 of the housing 20 symmetrically relative to the above-defined plane. Such an embodiment is schematically illustrated in FIGS. 11 and 12. FIGS. 11 and 12 show a longitudinal show a longitudinal and a horizontal transverse sectional view of a schematically illustrated slide. The explanations provided above are also applicable to the embodiment illustrated in FIGS. 11 and 12.

In all embodiments described above, sealing member 8 is mounted on closing member 9. Without leaving the scope of the invention, it would be possible to reverse this arrangement. In other words, the sealing member could be mounted stationary on the housing and the cooperating sealing surfaces could be provided on the closing member 9. However, this would mean that the sealing member 8 is exposed to the medium flowing through the valve slide.

While specific embodiments of the invention have been shown and described in detail to illustrate the application of the inventive principles, it will be understood that the invention may be embodied otherwise without departing from such principles.

I claim:
1. In a valve slide including a slide housing, the slide defining a passage opening having an axis, a closing member which is slidable in its plane into a closed position for closing the passage opening, a sealing surface being provided on the housing in the region of the slide passage opening, a circumferentially closed sealing member formed in one piece arranged on the closing member, the sealing member resting against the sealing surface when the closing member is in the closed position, the sealing surface having imaginary straight generatrices extending parallel to the axis of the slide passage opening, the sealing member having two principal sections and lateral sections connecting the principal sections, the two principal sections of the sealing member being located in planes which are spaced apart from each other and extend perpendicularly to the axis of the passage opening, the closing member having a surface which carries the circumferentially closed sealing member and corresponds in its shape to the sealing surface of the housing, the improvement comprising the lateral sections of the circumferentially closed sealing member being U-shaped and having sides, the sides of the U-shaped lateral sections being located in a plane, the sealing surface having portions which are located one behind the other in axial direction of the slide passage opening, the sealing surface portions being contacted by the principal sections of the sealing member when the sealing member is in the closed position, the sealing surface portions having an area in which they have a common straight generatrix which extends parallel to the axis, laterally outwardly extending plane sealing surface portions being connected in the area to the sealing surface portions which are located one behind the other, the plane sealing surface portions being located in planes which extend parallel to each other and parallel to the axis of the slide passage opening.

2. The valve slide according to claim 1, wherein the plane sealing surface portions are located in a common plane.

3. The valve slide according to claim 1, wherein the sealing surface portions which are located one behind the other are essentially cylindrically shaped and are connected to the plane sealing surface portions through continuously curved portions.

4. The valve slide according to claim 1, wherein the two principal sections of the sealing member are shaped differently.

5. The valve slide according to claim 4, wherein one of the principal sections is straight and the other principal section is curved.

6. The valve slide according to claim 1, wherein the sealing surface portions are formed on a structural component separately manufactured and welded to the housing.

7. The valve slide according to claim 1, wherein the valve housing is divided perpendicularly to the axis of the slide passage opening into two halves, wherein the sealing surface portions are exclusively provided on one of the valve housing halves.

8. The valve slide according to claim 1, wherein the closing member is a plane plate and the sealing member has end faces, step-like recesses being provided on the end faces.

9. The valve slide according to claim 8, wherein the closing member has a rim extending parallel to the closing direction of the closing member, the rim being guided at or in a groove defining the housing.

10. The valve slide according to claim 1, wherein the closing member has at the lower side thereof relative to the valve housing and on at least one side of the sealing member a protective edge which projects relative to the sealing member in closing direction of the closing member, and a groove-like recess is provided in the housing adjacent the sealing surface for receiving the protective edge when the closing member is in the closed position.

11. The valve slide according to claim 1, wherein the sealing member and the surfaces carrying the sealing member and the sealing surfaces of the housing are constructed symmetrically relative to the plane of the slide passage opening or a plane extending parallel to the slide passage opening

* * * * *